United States Patent [19]

Chang

[11] Patent Number: 4,943,333
[45] Date of Patent: Jul. 24, 1990

[54] MANUFACTURING PROCESS FOR WOODEN CUES TO PROVIDE PERMANENT STRAIGHTNESS

[76] Inventor: Jung-Shih Chang, 28, Lane 25, Li-Min Str., Tali, Taichung 41215, Taiwan

[21] Appl. No.: 202,813

[22] Filed: Jun. 6, 1988

[30] Foreign Application Priority Data

May 6, 1988 [TW] Taiwan .................. 77101941

[51] Int. Cl.⁵ .................. B29C 43/18; B29C 67/14
[52] U.S. Cl. .................. 156/153; 156/187; 264/134; 264/139; 264/156; 264/257; 273/68
[58] Field of Search .................. 273/68; 264/257, 258, 264/129, 134, 155, 159, 139, 156; 428/12; 156/153, 187

[56] References Cited

U.S. PATENT DOCUMENTS

| | | | |
|---|---|---|---|
| 1,459,144 | 6/1923 | Davenport | 273/68 |
| 1,679,073 | 7/1928 | Carmichael | 273/68 |
| 1,702,292 | 2/1929 | Barrett | 273/68 |
| 2,257,326 | 9/1941 | Blum | 273/68 |
| 3,368,271 | 2/1968 | Scheffler | 273/68 |
| 3,692,609 | 9/1972 | Eckes | 273/68 |

FOREIGN PATENT DOCUMENTS 726578 1/1966 Canada .................. 273/68

*Primary Examiner*—Jay H. Woo
*Assistant Examiner*—Jeremiah F. Durkin, II
*Attorney, Agent, or Firm*—Birch, Stewart, Kolasch & Birch

[57] ABSTRACT

A process for manufacturing wooden cues involves turning a wooden stick to obtain a certain diameter cue. This cue is then drilled to form holes, thereby destroying the composition of the wood fibers. Next, a glue and composite material are coated on the cue resulting in a preferred diameter cue size. The cue is then placed in a mold, pressed and heat dryed. The ends of the cue are then cut to an appropriate length and stoppers are added to the ends thereof. The resulting cue will be water-proof and will avoid warping, even over an extended period of use.

9 Claims, 2 Drawing Sheets

MANUFACTURING PROCESS FOR WOODEN CUES TO PROVIDE PERMANENT STRAIGHTNESS

BACKGROUND OF THE INVENTION

The present invention relates to a special manufacturing process for wooden cues to provide permanent straightness.

The general cues used in billiards are different in size and diameter, and there are several kinds of materials applied for manufacturing cues, such as wood, aluminum, graphite, fiberglass . . . etc. However, due to cost consideration or preference of users, the wooden cues are most popularly accepted.

Despite their popularity, the regular wooden cues easily become warped after a period of use so that the accuracy in performance will be seriously affected.

In order to solve the above mentioned problem, the present invention has created a special manufacturing process to keep the wooden cues in constant formation.

SUMMARY OF THE INVENTION

The present invention relates to a special manufacturing process for wooden cues to provide permanent straightness and more particularly to a manufacturing process to destroy the fiber construction of the wood to prevent the reciprocal influence of the wood fibers; to cover a layer of water-proof material over the wooden cue to prevent absorption of moisture and to reinforce the strength of the cue; and to attach a water-proof stopper at both ends of the cue to isolate the wood from contact with air, whereby a standardized wooden cue with constant straightness is provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 4a and 4b show a process of covering an epoxy dipped fiber cloth over a wooden cue, according to the present invention wherein FIG. 4b is an enlarged view taken from the encircled area A of FIG. 4a;

DETAILED DESCRIPTION OF THE PREFERRED EMBODIMENT

Figure 1:
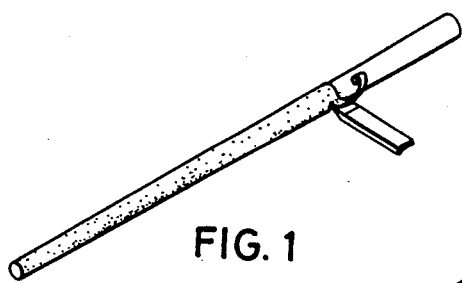
FIG. 1 shows a turning process for making a wooden cue.
Figure 2:
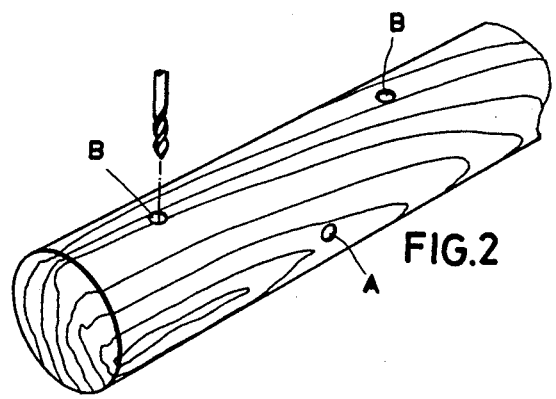
FIG. 2 shows a drilling process according to the present invention.

As shown in FIG. 1, a wooden cue, after a heat drying process, is turned off to a diameter 0.4 mm-2.4 mm below standard according to requirements for weight and flexibility. Several holes are drilled into the wood stick thus obtained as shown in FIG. 2, to destroy the composition of the wooden fibers. These holes are drilled horizontally from three o'clock to nine o'clock and vertically from twelve o'clock to six o'clock.

The drilling process is repeated several times at different and proper locations. Because the annual rings of the wood structure are irregular and because of the irregularlity of the wood fiber, the density and hardness of the wood are irregular which makes it difficult to keep a wood stick straight when it is affected by moisture, including moisture in the air.

Figure 3:
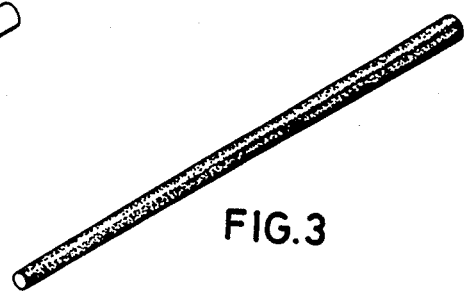
FIG. 3 shows a cue covered with an adhesive glue, according to the present invention.
Figure 4A:
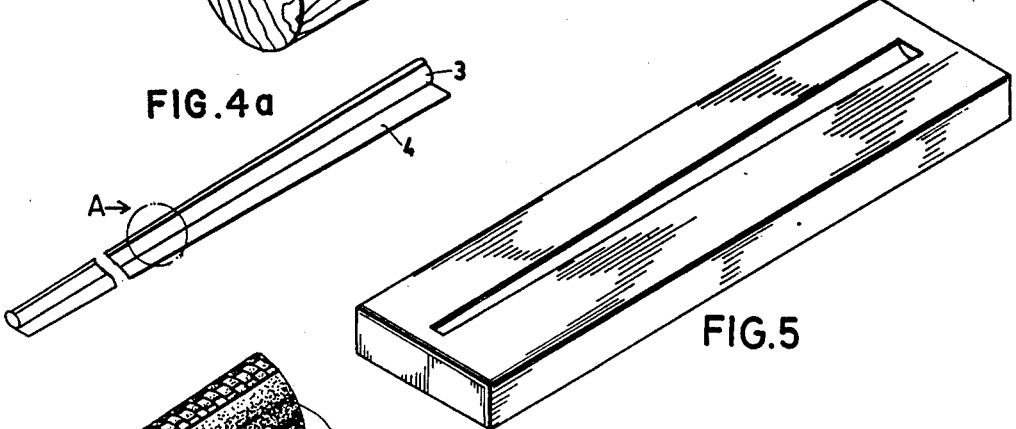
Figure 4B:
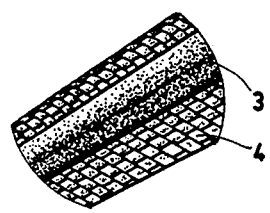

To reduce the reciprocal influence of the wood fibers when they are affected by external moisture or by an internal change in the wood moisture, it is necessary to drill and destroy the wood fiber. The wooden cue thus obtained is coated, as shown in FIG. 3, with one layer of an adhesive, AB Glue. The AB glue coated wooden cue thus obtained is then covered, as shown in FIG. 4, with an epoxy dipped fiber cloth to have a proper thickness, corresponding to the amount which was turned off from the wooden stick. The glue coating protects the cue from moisture penetration and reinforces the strength of the cue.

Figure 5:
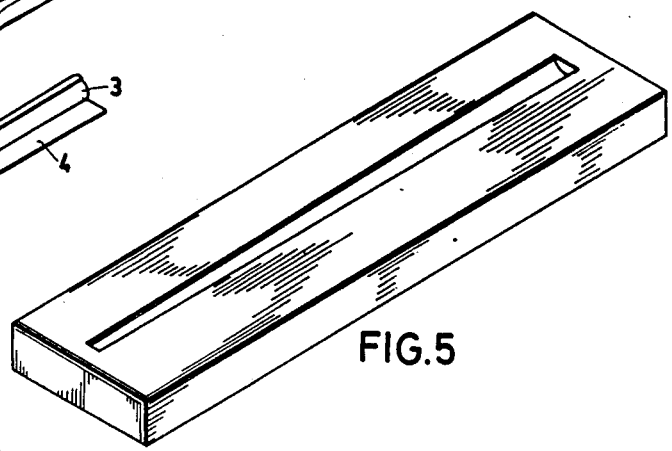
FIG. 5 shows half of the mold used, according to the present invention.

The fiber cloth covered wooden cue thus obtained is then placed in a mold, as shown in FIG. 5, for pressing and heat drying. After pressing and drying, the wooden cue thus obtained is cut at both ends into a proper length. Water-proof stoppers are then attached to each end of the cut cue. The stopper used is different according to the type of the wooden cues.

Figure 6:
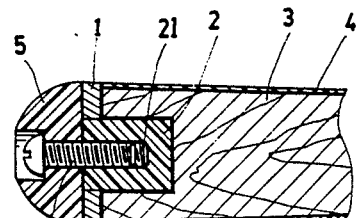
FIG. 6 is a perspective view of a stopper attached at the bottom of a one piece tYPe wooden cue, according to the present invention.
Figure 7:
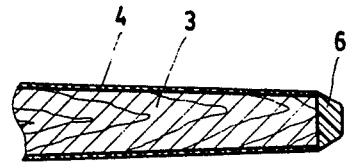
FIG. 7 is a perspective view of a stopper attached at the tip of a one piece type of wooden cue, according to the present invention.

As shown in FIG. 6, the stopper attached at the bottom of a one piece type of wooden cue comprises a metal ring 1 and a nylon cock 2. The stopper is attached to the body 3 and the epoxy dipped fiber cloth 4 by means of a water-proof reinforcing adhesive. The nylon cock 2 has a bolt hole 21 for the bolt 22 to screw up a rubber or plastic block 5, wherein the metal ring 1 and the nylon cock 2 form a water-proof stopper. The cock 2 can also be made of metal or other material. As shown in FIG. 7, the stopper attached at the tip of a one piece type of wooden cue is made of a leather block 6, which is attached to the wooden cue by means of a water-proof reinforcing adhesive.

Figure 8:
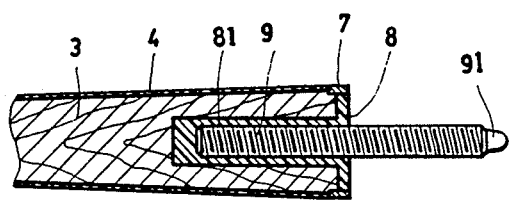
FIG. 8 is a perspective view of a stopper attached at the front piece of a two piece or multi-piece, built-up type of wooden cue, according to the present invention.

Referring to FIG. 8, the structure of the stopper used in the front of a two piece or multi-piece built-up type of wooden cue is shown. This stopper comprises a metal ring 7, a nylon cock 8 and a metal screw neck 9 which is attached to the body 3 and the fiber cloth 4 by means of a water-proof reinforcing adhesive. The screw neck 9 is screwed in the bolt hole 81 of the nylon cock and retained therein by means of a reinforcing adhesive with another end which comprises a push-pull portion 91 protruding beyond the wooden cue body 3.

Figure 9:
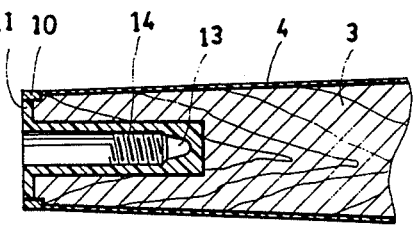
FIG. 9 is a perspective view of a stopper attached at the rear piece of a two piece or multi-piece, built-up type of wooden cue, according to the present invention.

Referring to FIG. 9, the structure of the stopper used in a two piece or multi-piece, built-up type of wooden cue is shown. This stopper comprises a metal ring 10 and a nylon cock 11. The nylon cock 11 is a tubular cock comprising an internal thread 12, and a recess 13 at the bottom for receiving the push-pull portion 91 of the metal screw neck 9 to keep the built-up wooden cue straight.

Figure 10:
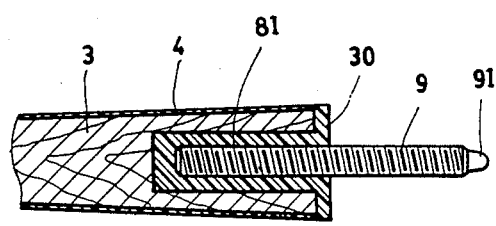
FIGS. 10 and 11 show another preferred embodiment of linking stoppers, according to the present invention.
Figure 11:
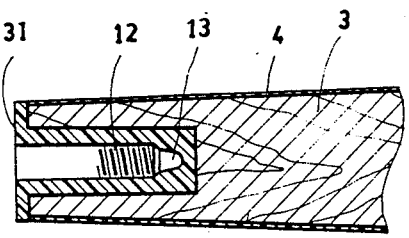

Referring to another embodiment shown in FIG. 10 and FIG. 11, a linking stopper is shown wherein the cock 30, 31 is directly made of metal, nylon or other material in one solid piece and is attached to the wooden cue body 3 and the fiber cloth 4 by means of a water-proof adhesive to isolate the wooden fibers from the air.

As described above, the present manufacturing process is characterized by the drilling process partly and properly destroying the composition of the wooden fibers to prevent warping of the wooden fibers and the cover of epoxy dipped graphite or fiberglass cloth prevents destruction of the composition of the wooden stick to reinforce the strength o the wooden cue. After a long period of test over three years, the wooden cues made according to the present manufacturing process have been proven to achieve the objects desired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for manufacturing a wooden cue comprising the steps of:
    turning a wooden stick to obtain a wooden preliminary cue having a first predetermined diameter and having a longitudinal axis;
    drilling a plurality of holes into the preliminary cue, said holes being nonparallel to the longitudinal axis of the preliminary cue, said holes destroying the composition of fibers in the wooden preliminary cue to thereby reduce reciprocal influence of the fibers to aid in maintaining straightness in the cue over an extended period of time;
    coating the preliminary cue with an adhesive, said adhesive generally filling the plurality of holes in the preliminary cue;
    covering the cue with a covering material to form a cue having a second predetermined diameter, said second diameter being greater than said first diameter, said covering material being one of a resin dipped cloth and a heat-resistant covering material;
    pressing and drying the cue covered with the covering material;
    cutting ends of the cue covered with the covering material to obtain a cue with a predetermined length; and
    attaching a stopper to each end of the cut cue to form a water-proof wooden cue, said wooden cue generally maintaining the straightness thereof.

2. The method for manufacturing a wooden cue as recited in claim 1, further comprising the steps of:
    cutting the cue covered with the covering material at least one position intermediate the ends thereof; and
    attaching secondary stoppers at each intermediate end obtained by the cutting to thereby form a water-proof wooden cue having a plurality of sections.

3. The method for manufacturing a wooden cue as recited in claim 2, further comprising the step of using a water-proof reinforcing adhesive to attach the secondary stoppers to the intermediate ends.

4. The method for manufacturing a wooden cue as recited in claim 1, wherein the plurality of holes are drilled into the preliminary cue generally perpendicular to the longitudinal axis.

5. The method for manufacturing a wooden cue as recited in claim 1, wherein said drilling comprises the steps of drilling a series of holes around the periphery of the preliminary cue at positions corresponding to twelve o'clock, three o'clock, six o'clock and nine o'clock with respect to a cross section of said preliminary cue.

6. The method for manufacturing a wooden cue as recited in claim 5, wherein said holes around the periphery of the preliminary cue are nonaligned and further comprising the step of drilling a series of a plurality of holes along the length of the preliminary cue.

7. The method for manufacturing a wooden cue as recited in claim 1, further comprising the step of drying the wooden stick before the turning.

8. The method for manufacturing a wooden cue as recited in claim 1, wherein said coating further comprises the step of using glue as the adhesive, said glue protecting said cue from moisture and strengthening said cue.

9. The method for manufacturing a wooden cue as recited in claim 1, wherein said attaching the stopper further comprises the step of attaching the stopper by a water-proof reinforcing adhesive whereby said wooden cue is water-proof and air-tight.

* * * * *